United States Patent [19]

Westberg

[11] 4,063,758
[45] Dec. 20, 1977

[54] COUPLING FOR PIPES

[75] Inventor: Alvar Torsten Westberg, Sandviken, Sweden

[73] Assignee: Sandvik Aktiebolag, Sandviken, Sweden

[21] Appl. No.: 756,795

[22] Filed: Jan. 4, 1977

Related U.S. Application Data

[63] Continuation of Ser. No. 587,617, June 17, 1975, abandoned.

[30] Foreign Application Priority Data

May 13, 1975 United Kingdom ............... 20203/75

[51] Int. Cl.² .............................................. F16L 23/00
[52] U.S. Cl. ..................... 285/177; 138/89; 285/137 R; 285/336; 285/364; 285/DIG. 2
[58] Field of Search ............. 285/336, 364, 406, 411, 285/407, 365, 408, 409, 410, 405, 137 R, 177, DIG. 2, 367, 421; 403/338, 336, 335

[56] References Cited

U.S. PATENT DOCUMENTS

| 180,781 | 8/1876 | Morgan | 403/338 X |
|---|---|---|---|
| 758,888 | 5/1904 | Barrett | 285/177 X |
| 1,639,225 | 8/1927 | Grace | 285/406 X |
| 2,353,572 | 7/1944 | Kuster et al. | 285/411 X |
| 2,541,205 | 2/1951 | Christophersen | 285/367 X |
| 2,690,939 | 10/1954 | Whaley | 285/365 X |
| 2,836,117 | 5/1958 | Lankford | 285/365 X |

Primary Examiner—Thomas F. Callaghan
Attorney, Agent, or Firm—Burns, Doane, Swecker & Mathis

[57] ABSTRACT

Pipe ends are connected by a pipe joint comprising radially extending flanges, a sealing ring and clamping means connected to one of the flanges by holding means extending substantially radially inwardly toward the axes of the pipe joint.

1 Claim, 5 Drawing Figures

COUPLING FOR PIPES

This is a continuation of application Ser. No. 587,617, filed June 17, 1975 and now abandoned.

The present invention relates to pipe joints of the type wherein the pipe ends have opposed radially extending flanges kept together by clamping means around the periphery of the flanges. In particular, the pipe joint of the invention is meant for coupling tubes having large differences in diameters, being used in plants with limited lateral space which restricts the diameter of the joints and of the tubing. The pipe joint according to the invention can be used for connection of furnace tubes — often having a diameter of 4 or 5 inches with smaller tubes or so-called "pig tails" — often having a diameter of as little as 1 inch — in steam reformer plants for the manufacture of synthetic gas.

Up to now, such tubes have been coupled by means of flanges of a conventional type provided with protruding edges or "ears", to which edges clamping means such as screws or bolts have been applied. Said screws or the like have usually extended in the same longitudinal direction as the tubes in order to clamp the flanges together, the screws being numerous and the flanges being of large and rigid construction to give sufficient tightness and stability under severe operation conditions. This meant in its turn that considerable space was needed for the pipe couplings and also time-consuming mounting and dismounting of the joint.

According to one aspect of the present invention, there is provided a pipe joint for connecting pipe ends, each pipe end having a radially extending flange, the two said flanges having opposed mating surfaces which form between them an annular channel for a sealing ring, the flanges being clamped together at their periphery by clamping means connected to one of the flanges by holding means such as a screw extending substantially radially inwardly towards the axis of the pipe joint.

A preferred embodiment of the invention will now be described with reference to the accompanying drawings, in which.

Figure 1:
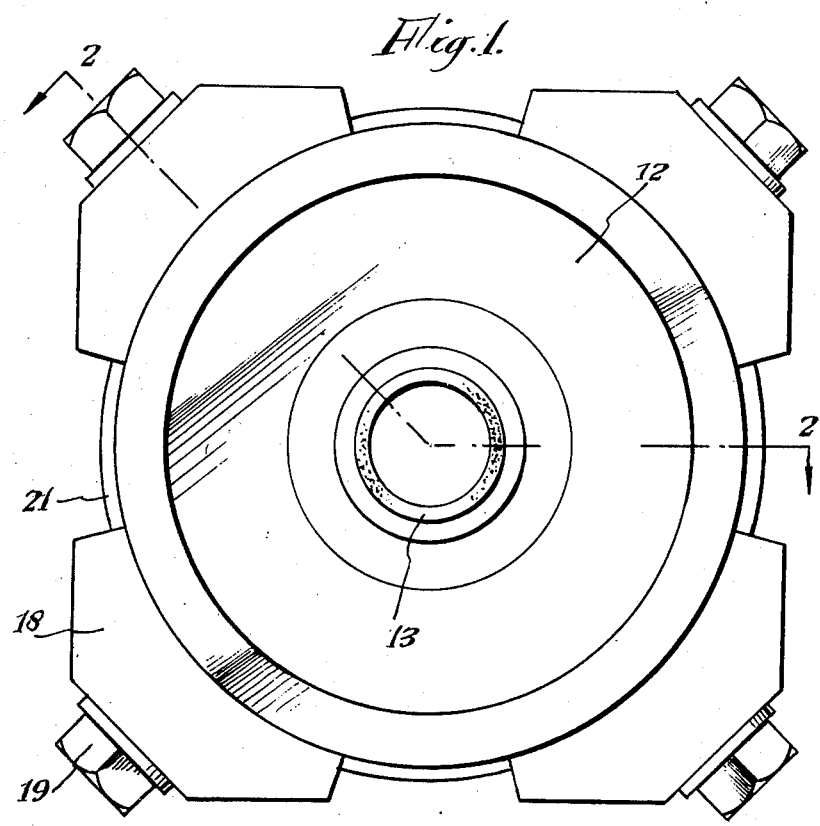
FIG. 1 is an end view of a pipe joint according to the invention.
Figure 2:
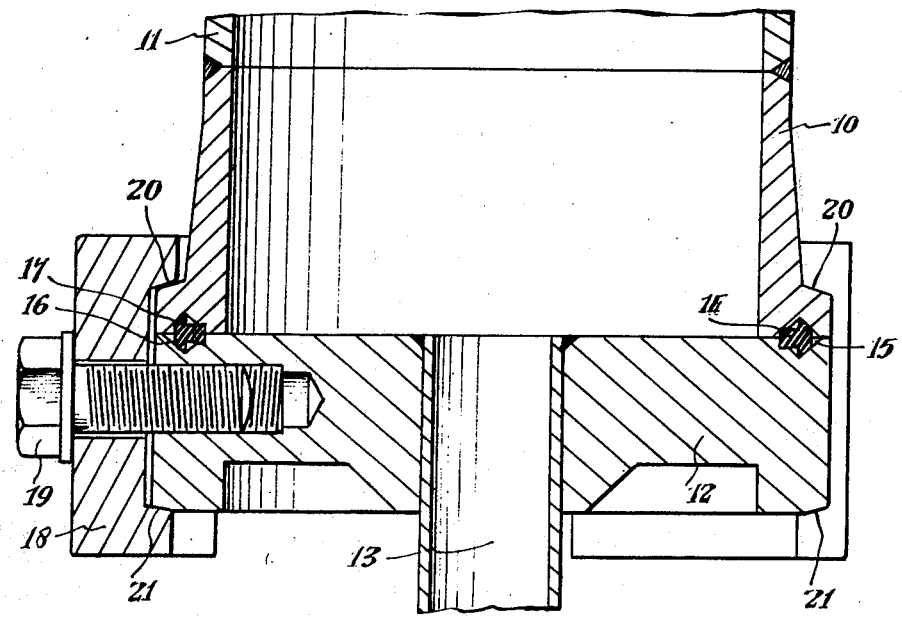
FIG. 2 is a transverse cross-sectional view of the pipe joint along the line 2—2 in FIG. 1.

The pipe coupling shown in FIGS. 1 and 2 comprises a flange 10 which is joined to a large diameter tube 11, for example a furnace tube, for example by means of welding, and a large flange 12 — a reducing flange — to which a smaller diameter tube 13 is fastened in a similar way. Between the flanges 10, 12 there is a sealing ring 14 in a channel 15 which is formed by annular grooves 16, 17 in the flanges. The flanges are pressed together, by the wedging action of a clamping device 18 having an inwardly U-formed profile.

In the shown embodiment, the clamping device consists of four clamps 18 which are pressed against the out-turned surfaces 20, 21 of the flanges by means of screws 19.

The locating action of the screw of other fastening means 19 of the clamps 18 is a characteristic feature of the new pipe joint. By fastening the screw 19 in the reducing flange 12 itself and directing the longitudinal movement of the screw radially inwardly towards the axis of the pipe joint, the space required will be much smaller compared to conventional couplings. The construction according to the invention also means that the pipe joint can be mounted and dismounted without removing the clamps 18 from the joint. Dismounting can thus be done by displacing the reducing flange 12 with the attached clamps 18, after the screws have been loosened and unscrewed about ten millimeters.

When using the pipe joint of the invention in a steam reformer, the void space between the furnace tubes can be reduced by about 20% in comparison with previously known constructions. This means a considerable reduction of the cost of the furnace and the building, because said distance (in its turn determined by the diameter of the flanges or the protrusion of the clamping means) determines the length of the furnace and the building. In current plants the number of the actual tube connections is often about 400.

Figure 3:
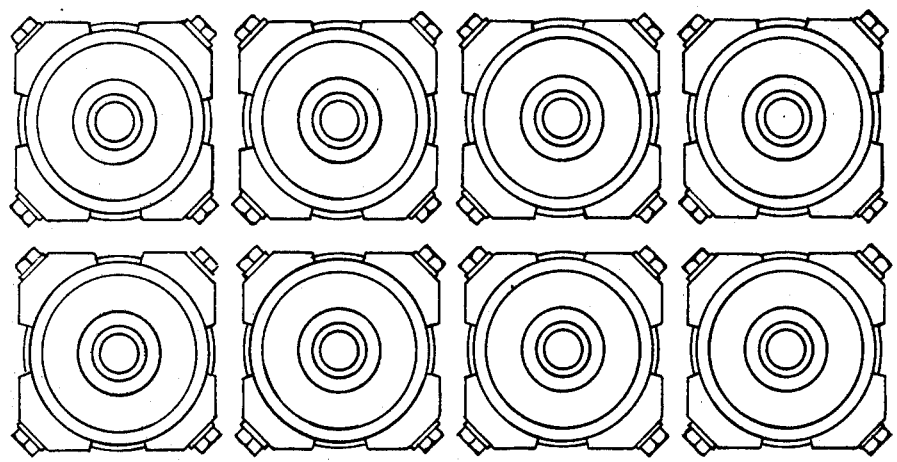
FIG. 3 shows a close packed arrangement of parallel pipes comprising pipe joints according to the invention.

The use of several separate, symmetrically placed, clamps instead of a solid clamping ring or a clamping strip is also beneficial in this connection. It is obvious that the shown embodiment having 4 clamps placed at the corners of an imaginary square permits a close-packed arrangement of the tubes as shown in FIG. 3. Similarly, an embodiment with 3 or 6 clamps would allow a close-packed triangular or hexagonal arrangement respectively. The clamps may be manufactured by forging but also from blank tubing, such as a tube-ring giving 6 clamps. Because most parts in a steam reformer plant have to be made of heat-resistant alloys such as stainless steels or the like, any reduction of material means great economical benefits.

Figure 4:
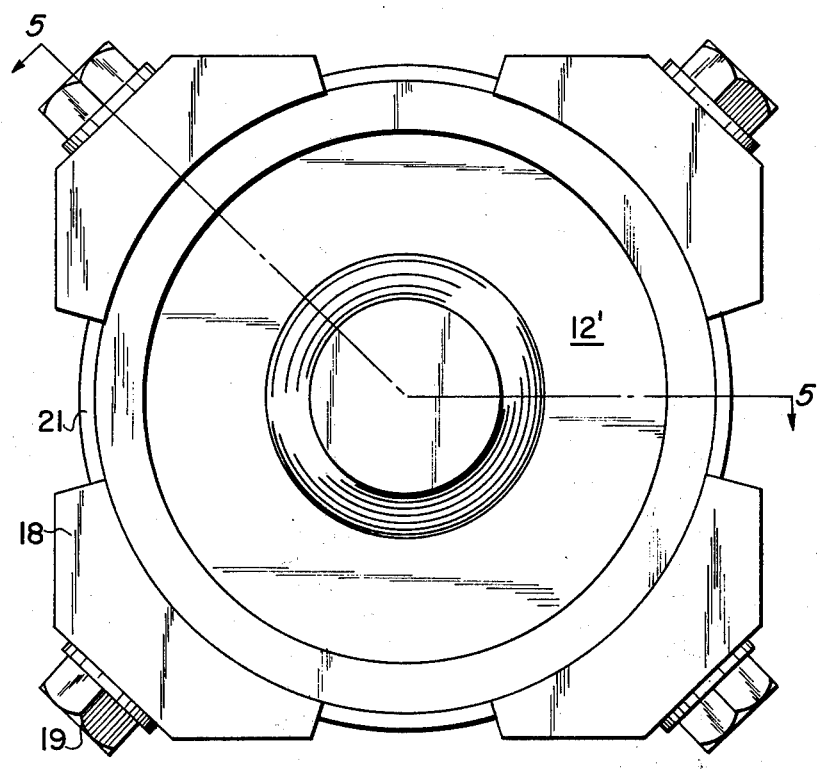
FIG. 4 is a top plan view of a modification of the pipe joint illustrated in FIGS. 1 and 2.
Figure 5:
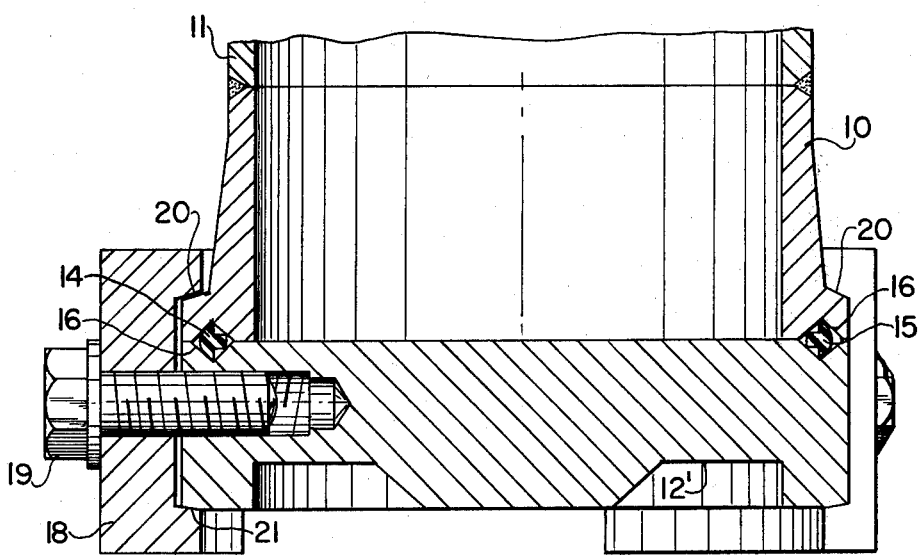
FIG. 5 is a transverse cross-sectional view of the pipe joint along the line 5—5 of FIG. 4.

In principle, the pipe joint according to the invention can be used in any kind of coupling in which a large tube is to be connected with an essentially smaller tube. In the "extreme case", the dimension of the smaller tube may be zero, which means that a solid lid or cover may be attached to a flange of a tube, or a container or the like. In such case, as is illustrated in FIGS. 4 and 5, the flange 12 and tube 13 of the species illustrated in FIGS. 1 and 2 is replaced by a cover member or "blank" 12'.

I claim:

1. A pipe joint for connecting pipe ends having large differences in diameters, being used in a plant with limited lateral space, as connected between a large furnace pipe and a substantially smaller pipe, each pipe end having radially extending flange, the two said flanges having opposed mating surfaces which form between them an annular channel; and a sealing ring disposed in said channel, the flanges being clamped together at their periphery exteriorly of the pipes by clamping means connected to one of the flanges by holding means extending substantially radially inwardly towards the axis of the pipe joint, that flange to which is connected the clamping means being a reducing flange which accommodates a smaller pipe than does the opposed flange, said clamping means comprising a plurality of circumferentially spaced clamps presenting toward said flanges U-shaped profiles with inclined surfaces and said flanges presenting correspondingly inclined surfaces toward said clamps, said holding means comprising a screw for each clamp which is threaded into said one flange, whereby said holding means exerts a wedging action on said clamps forcing said flanges together.

* * * * *